No. 701,959.  
C. P. STEINMETZ.  
GLOWER FOR PYROELECTRIC LAMPS AND PROCESS OF MAKING SAME.  
(Application filed Nov. 6, 1901.)  
Patented June 10, 1902.

(No Model.)

Witnesses:

Inventor.  
Charles P Steinmetz  
by Albert G. Davis  
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

GLOWER FOR PYROELECTRIC LAMPS AND PROCESS OF MAKING SAME.

SPECIFICATION forming part of Letters Patent No. 701,959, dated June 10, 1902.

Application filed November 6, 1901. Serial No. 81,298. (No model.)

*To all whom it may concern:*

Be it known that I, CHARLES P. STEINMETZ, a citizen of the United States, residing at Schenectady, in the county of Schenectady and State of New York, have invented certain new and useful Improvements in Glowers for Pyroelectric Lamps and Process of Making the Same, (Case No. 2,264,) of which the following is a specification.

This invention relates to electric lamps of the pyroelectrolytic type, in which there is a glower of magnesium or other earthy metal which is non-conductive of electricity at ordinary temperatures, but which becomes conductive when heated. As customarily made the glower is a small stick of the selected material, with fine platinum leading-in wires wrapped around its ends. After the lamp has been running awhile the contact between these wires and the stick becomes greatly impaired, the stick growing smaller where the wires are wrapped around it, so that the winding becomes loose.

I find that by inclosing the wire-wound ends of the stick in magnetite and then fusing the magnetite the wasting away of the stick is prevented and the ends run much cooler than those of the ordinary lamp of this type.

Magnetite ($Fe_3O_4$) has the advantage of being conductive at all temperatures, slightly so when cold, but increasing rapidly with a rise in temperature. Moreover, it can be fused to make a firm compact mass at the joint between the wire and the stick, but yet it will successfully withstand the heat at which the stick becomes incandescent. Some other analogous compounds may serve equally well; but I find that magnetite is entirely satisfactory.

In carrying the invention into effect, the magnetite or the like in powdered form is sprinkled on the platinum wires where they are wound upon the ends of the glower. These ends are then heated for a moment, preferably in a small electric arc between carbon points, to melt the magnetite about the wires.

Figure 1:
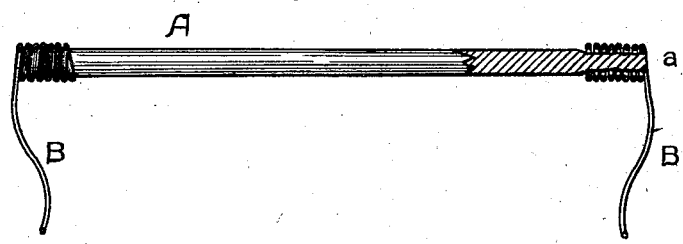
Figure 2:
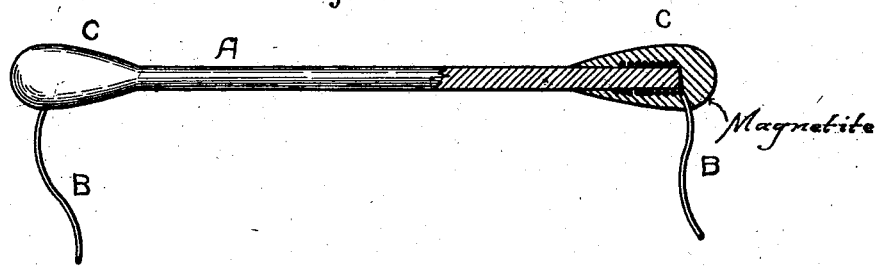

In the accompanying drawings, Figure 1 is side view of a glower on a very much enlarged scale, one end being in section to show how the stick diminishes in size when used. Fig. 2 is a similar view of a glower made according to my process.

The stick A is of magnesium or the like, and on each end is wound the platinum leading-in wire B. When in use, after a time the ends of the stick under the wires diminish in size, as shown at a, thus impairing the contact between said end and the wire.

By my invention the wire-wound end of the stick is inclosed in a fused mass of magnetite C, giving greater conductivity at these points, and thus tending to keep the ends cool, as well as also preventing the wasting away of the stick.

What I claim as new, and desire to secure by Letters Patent of the United States, is—

1. A glower for a pyroelectric lamp, consisting of a body of magnesium or the like, having leading-in wires, and magnetite or the like inclosing the joints between said wires and the body.

2. A glower for a pyroelectric lamp, consisting of a body of magnesium or the like provided at each end with a leading-in wire, and a mass of fused magnetite inclosing the joints between each wire and the body.

3. A glower for a pyroelectric lamp consisting of a body of magnesium or the like, leading-in wires wound on the ends of said body, and a mass of fused magnetite surrounding each of said wire-wound ends.

4. The process of making a pyroelectric glower, which consists in providing a body of suitable material with leading-in wires, and then inclosing the joints between said wires and body in magnetite or the like.

5. The process of making a pyroelectric glower, which consists in providing a body of suitable material with leading-in wires, inclosing the joints between said wires and body in magnetite, and then fusing the magnetite.

6. The process of making a pyroelectric glower, which consists in providing a body of suitable material with leading-in wires, placing powdered magnetite on the joints between said wires and body, and then fusing said magnetite.

In witness whereof I have hereunto set my hand this 4th day of November, 1901.

CHARLES P. STEINMETZ.

Witnesses:
BENJAMIN B. HULL,
MARGARET E. WOOLLEY.